(12) United States Patent
Ma et al.

(10) Patent No.: US 11,897,623 B2
(45) Date of Patent: Feb. 13, 2024

(54) DUCTED FAN DEVICE INTEGRATED WITH PERMANENT MAGNET SYNCHRONOUS DISC FLAT WIRE MOTOR

(71) Applicant: North University of China, Taiyuan (CN)

(72) Inventors: Tiehua Ma, Taiyuan (CN); Yanbing Zhang, Taiyuan (CN); Yaoyan Wu, Taiyuan (CN); Changxin Chen, Taiyuan (CN); Bin Jiao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 301 days.

(21) Appl. No.: 17/553,014

(22) Filed: Dec. 16, 2021

(65) Prior Publication Data

US 2022/0194608 A1 Jun. 23, 2022

(30) Foreign Application Priority Data

Dec. 18, 2020 (CN) .......................... 202011511353.X

(51) Int. Cl.
*H02K 1/27* (2022.01)
*B64D 27/24* (2006.01)
(Continued)

(52) U.S. Cl.
CPC ............ *B64D 27/24* (2013.01); *B64C 11/001* (2013.01); *B64C 29/0016* (2013.01)

(58) Field of Classification Search
CPC ............... F04D 29/281; F04D 29/4226; F04D 25/0693; F04D 29/663; F04D 17/08;
(Continued)

(56) References Cited

U.S. PATENT DOCUMENTS 4,549,858 A 10/1985 Vettori et al.
7,167,364 B2* 1/2007 Lopatinsky ........... H01L 23/467
165/122

(Continued)

FOREIGN PATENT DOCUMENTS

CN 1944091 A 4/2007
CN 105591492 A 5/2016
(Continued)

OTHER PUBLICATIONS

First Office Action in corresponding Chinese Patent Application No. 202011511353.X dated Jul. 26, 2021, 10 pages with translation.

*Primary Examiner* — Leda T Pham
(74) *Attorney, Agent, or Firm* — LOZA & LOZA, LLP; Michael Fedrick

(57) ABSTRACT

A ducted fan device integrated with a permanent magnet synchronous disc flat wire motor for a flying copter car, including a rotor system, a stator system, an air intake/exhaust control system, a detection system, a driving system and a power supply system. The stator system includes a motor shell, and flat wire coils respectively arranged on an upper end face and a lower end face of an inner wall of the motor shell are connected in series. The rotor system is arranged inside the stator system, including axial flow and radial flow composite integrated blades and permanent magnets. A part of centrifugal blades are replaced by the permanent magnets which are located on an outer side.

9 Claims, 9 Drawing Sheets

(51) Int. Cl.
*B64C 11/00* (2006.01)
*B64C 29/00* (2006.01)

(58) Field of Classification Search
CPC .... F04D 29/703; F04D 25/08; F04D 29/4206; F04D 25/068; F04D 25/06; F04D 17/10; H02K 1/2796; G06F 1/206; G06F 1/203
See application file for complete search history.

(56) References Cited

U.S. PATENT DOCUMENTS 10,473,107 B1  11/2019  Newton et al.
10,718,339 B2 *  7/2020  Patton .................... F04D 25/06

FOREIGN PATENT DOCUMENTS

| | | |
|---|---|---|
| CN | 107161014 A | 9/2017 |
| CN | 207426870 U | 5/2018 |
| CN | 208479314 U | 2/2019 |
| CN | 208782702 U | 4/2019 |
| CN | 209115394 U | 7/2019 |
| CN | 111306070 A | 6/2020 |
| CN | 210985876 U | 7/2020 |
| CN | 108284899 B | 10/2020 |
| CN | 111852915 A | 10/2020 |

* cited by examiner

DUCTED FAN DEVICE INTEGRATED WITH PERMANENT MAGNET SYNCHRONOUS DISC FLAT WIRE MOTOR

CROSS-REFERENCE TO THE RELATED APPLICATIONS

The present application is based upon and claims priority to Chinese Patent application No. 202011511353.X, filed on Dec. 18, 2020, the entire contents of which are incorporated herein by reference.

TECHNICAL FIELD

The disclosure relates to the technical field of flying copter cars, in particular to a ducted fan device integrated with a permanent magnet synchronous disc flat wire motor.

BACKGROUND

With the development of electrical technology, electrification revolution in the aviation industry is also in full swing. Electric airplanes have become a hot spot in the industry this year. They focus on vertical take-off and high-efficiency cruise flight. However, in order to achieve the purpose of vertical take-off, the electric airplanes need to be equipped with a power of about 10 times that of cruise flight, i.e. so-called "flight dead weight". "Flight dead weight" has greatly reduced an effective load of aircraft, and has become a restrictive factor restricting the realization of vertical take-off and landing of electric aircrafts.

At the same time, aviation safety is a first element in the development of aircraft technology. In the event of a major failure of power equipment of an existing electric aircraft, crash is often inevitable. How to effectively avoid the crash in case of a power failure of the aircraft is also a concern in the development of the industry.

SUMMARY

In order to overcome the above-mentioned shortcomings in the prior art, the disclosure provides a ducted fan device integrated with a permanent magnet synchronous disc flat wire motor. The permanent magnet synchronous disc flat wire motor, an axial flow and centrifugal composite fan, induction magnetic levitation, a high-speed gyro, flywheel energy storage and other technologies are integrated, and the ducted fan device integrated with the permanent magnet synchronous disc flat wire motor is developed. A bearing mechanism may be omitted so that the weight of the equipment can be reduced, mechanical wear and noises are reduced, efficiency is improved, service life is prolonged, and costs are lowered.

In order to solve the above technical problems, a technical solution adopted by the disclosure is as follows:

A ducted fan device integrated with a permanent magnet synchronous disc flat wire motor includes a rotor system, a stator system, an air intake/exhaust control system, a detection system, a driving system and a power supply system. The stator system includes flat wire coils, a motor shell and a stator conical shaft. The motor shell is of an annular barrel structure. A plurality of layers of flat wire coils are respectively arranged on an upper end face and a lower end face of an inner wall of the motor shell. The flat wire coils on each of the end faces are connected in series in an end-to-end mode. The stator conical shaft is fixedly connected with a bottom of the motor shell through a plurality of fixed pieces. The rotor system is arranged inside the stator system. The rotor system includes axial flow and radial flow composite integrated blades, a conical connecting sleeve and permanent magnets. The conical connecting sleeve is matched with the stator conical shaft. The axial flow and radial flow composite integrated blades are distributed in a circumferential direction of an outer side face of the conical connecting sleeve. The permanent magnets are arranged on outer sides of the axial flow and radial flow composite integrated blades. The permanent magnets are located between an upper set and a lower set of the plurality of layers of flat wire coils. The detection system is electrically connected with the motor shell and the power supply system. The driving system is electrically connected with the flat wire coils and the power supply system, and the detection system is electrically connected with the driving system.

The stator system further includes a diffusion cavity, and the diffusion cavity and the motor shell are tangentially arranged. The diffusion cavity and the motor shell are arranged in a communicating mode to perform diffusion diversion on centrifugal compressed gas. A centrifugal exhaust cover plate is arranged at an exhaust port of the diffusion cavity. A centrifugal control motor is arranged outside the exhaust port of the diffusion cavity, and a side of the centrifugal exhaust cover plate is connected with the centrifugal control motor through a connecting shaft.

From inner to outer of the axial flow and radial flow composite integrated blades along a radial direction, axial flow blades are arranged on an inner ring, and vertical radial flow centrifugal blades are arranged on an outer ring.

The air intake/exhaust control system includes an air inlet cover plate, a linear control motor, axial flow exhaust guide plates and axial flow control motors. The air inlet cover plate is of a circular thin plate structure, and the air inlet cover plate is arranged at an air inlet in an upper end face of the motor shell. The linear control motor is arranged inside the stator conical shaft. A top end of the linear control motor is in screw connection with the air inlet cover plate. The linear control motor is configured to control lifting of the air inlet cover plate so as to control opening and closing of the air inlet and a size of the air inlet. The axial flow control motors are distributed at a circumference inside the stator conical shaft. The axial flow exhaust guide plates are of a fan-shaped plate structure, one sides of the axial flow exhaust guide plates are connected with the axial flow control motors through connecting shafts, while the other sides are in shaft connection with the bottom of the motor shell through connecting shafts.

The detection system includes gap sensors and a signal analysis control panel. A plurality of sets of gap sensors are arranged, and the plurality of sets of gap sensors are evenly distributed along a circumferential direction inside a cylindrical face of the motor shell. The plurality of sets of gap sensors are evenly distributed on an upper end face of the motor shell. The gap sensors are connected with an amplifying circuit through cables and are finally connected with the signal analysis control panel, and the signal analysis control panel is electrically connected with the driving system.

The driving system adopts a variable frequency alternating current machine driver.

The power supply system includes a booster and an inverter.

The flat wire coils are of an annular tooth-shaped structure. Three sets of flat wire coils are arranged in total, and the flat wire coils in each set are alternately arranged.

The diffusion cavity is of a square shell structure, and the centrifugal exhaust cover plate is of a square plate-shaped structure matched with a section of the diffusion cavity.

Compared with the prior art, the disclosure has the beneficial effects as follows:

By compositing the axial flow and centrifugal blades, the blades have functions of axial gas compression and centrifugal gas compression at the same time and will satisfy an application scenario with needs for axial and centrifugal gas compression at the same time.

Through an integrated design combining a permanent magnet synchronous disc flat wire rotor and the blades, i.e. an integrated design of power and execution mechanisms, a traditional split design of fan blades and power is abandoned. A structural design is greatly optimized, and an equipment volume is reduced, and meanwhile heat dissipation capacity of a motor is improved.

Due to the special rotor design, the ducted fan device has flywheel energy storage and gyro stabilization effects. Through the flywheel energy storage effect, on the one hand, the motor have the characteristics of short-time high power due to flywheel energy storage, and on the other hand, rotor blades are prevented from immediately stopping rotation when equipment power supply fails, so safety is improved; and through the gyro stabilization effect, on the one hand, the detection system may be used as a gyro sensor to detect six-degree-of-freedom attitude of the rotor, and on the other hand, gyro stability makes the rotor have a certain anti-interference ability, so the specially designed rotor with the flywheel energy storage and gyro stabilization effects is especially suitable for the field of aircrafts. Because of a magnetic levitation design of the rotor, a bearing mechanism is omitted from equipment, and therefore the weight of the equipment is reduced, and meanwhile the rotor will adaptively find a suitable rotation center during high-speed rotation, which eliminates the problem of dynamic imbalance of a high-speed rotating body and reduces the processing difficulty and production cost.

Figure 1:
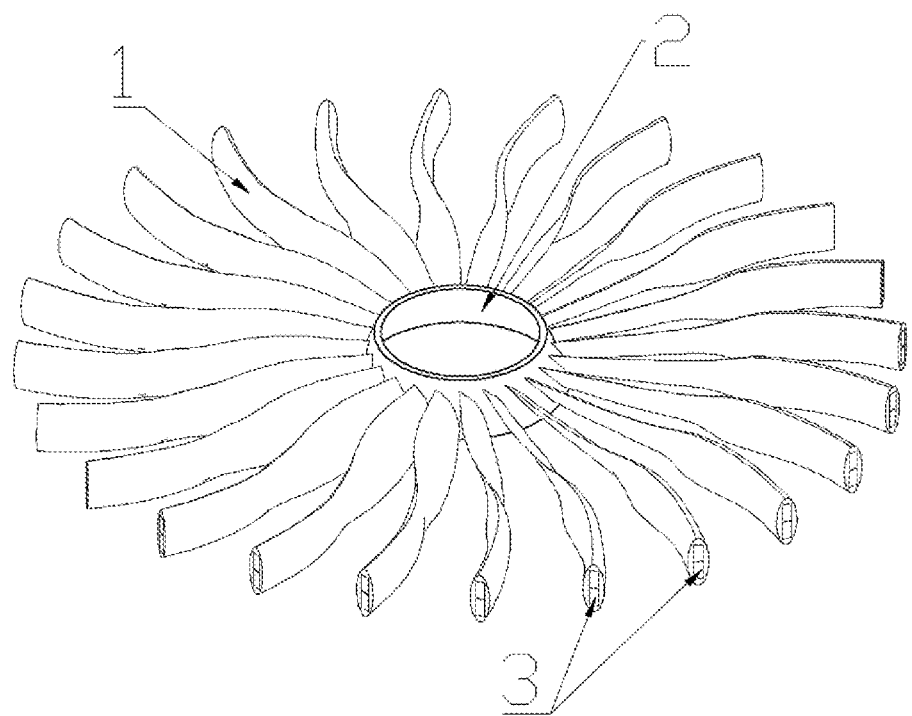
FIG. 1 is an axonometric drawing of a rotor system according to an embodiment of the disclosure.

A same reference refers to the same component in the drawings and some components are omitted for simplicity to avoid unnecessary redundancy: 1—axial flow and radial flow composite integrated blade, 2—conical connecting sleeve, 3—permanent magnet, 4—flat wire coil, 5—motor shell, 6—stator conical shaft, 7—diffusion cavity, 8—air inlet cover plate, 9—linear control motor, 10—axial flow exhaust guide plate, 11—axial flow control motor, 12—centrifugal exhaust cover plate, 13—centrifugal control motor, 14—gap sensor, 15—signal analysis control panel, 16—variable frequency alternating current machine driver, 17—booster, and 18—inverter.

DETAILED DESCRIPTION

Technical solutions in embodiments of the disclosure will be described clearly and completely below. Apparently, the described embodiments are only a part of the embodiments of the disclosure, rather than all the embodiments. Based on the embodiments of the disclosure, all other embodiments obtained by those of ordinary skill in the art without creative work shall fall within the protection scope of the disclosure.

Figure 2A:
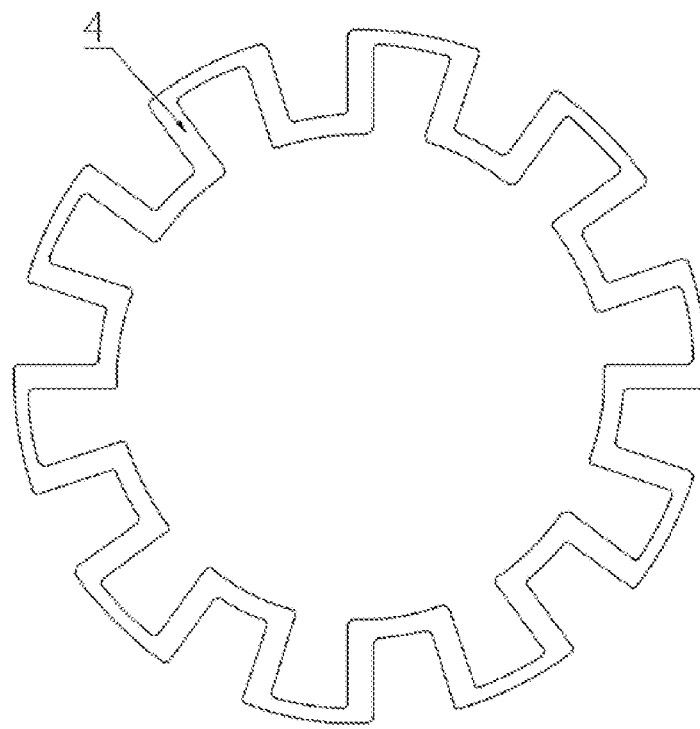
FIG. 2A is a top view diagram of a single-phase flat wire coil of a stator system according to an embodiment of the disclosure.
Figure 2B:
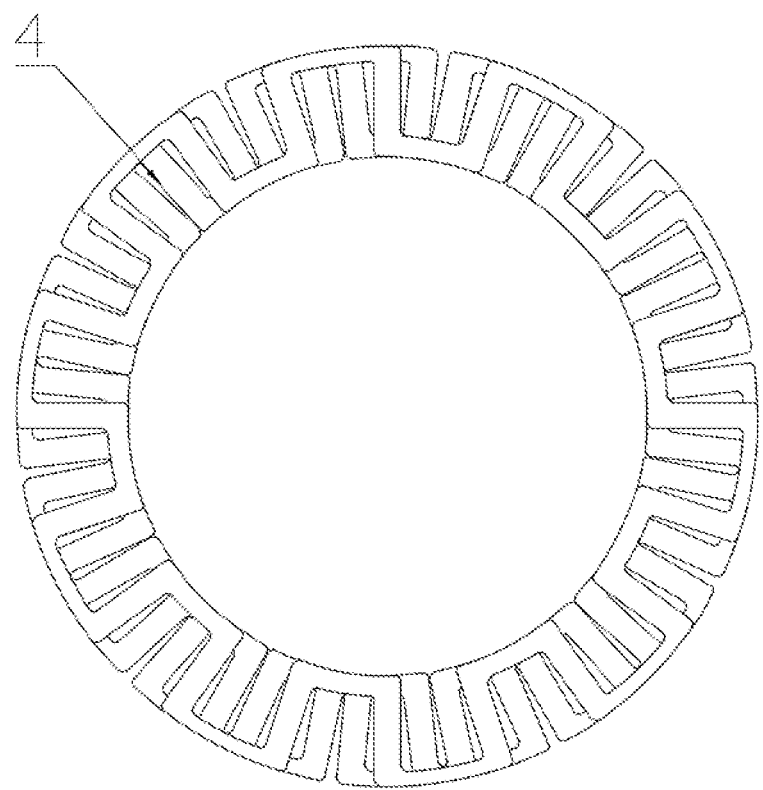
FIG. 2B is a top view diagram of a three-phase flat wire coil of a stator system according to an embodiment of the disclosure.
Figure 2C:
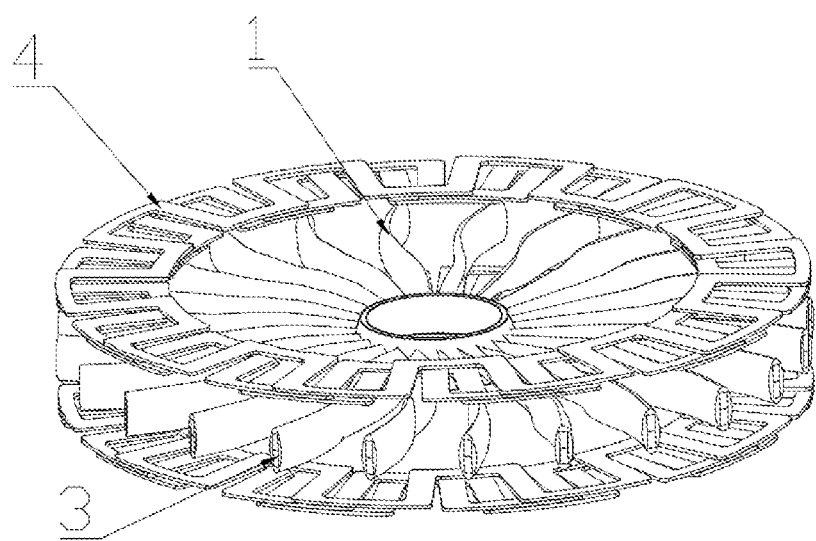
FIG. 2C is a top view diagram of the three-phase flat wire coil in FIG. 2B in assembly with a rotor system of the disclosure.
Figure 3A:
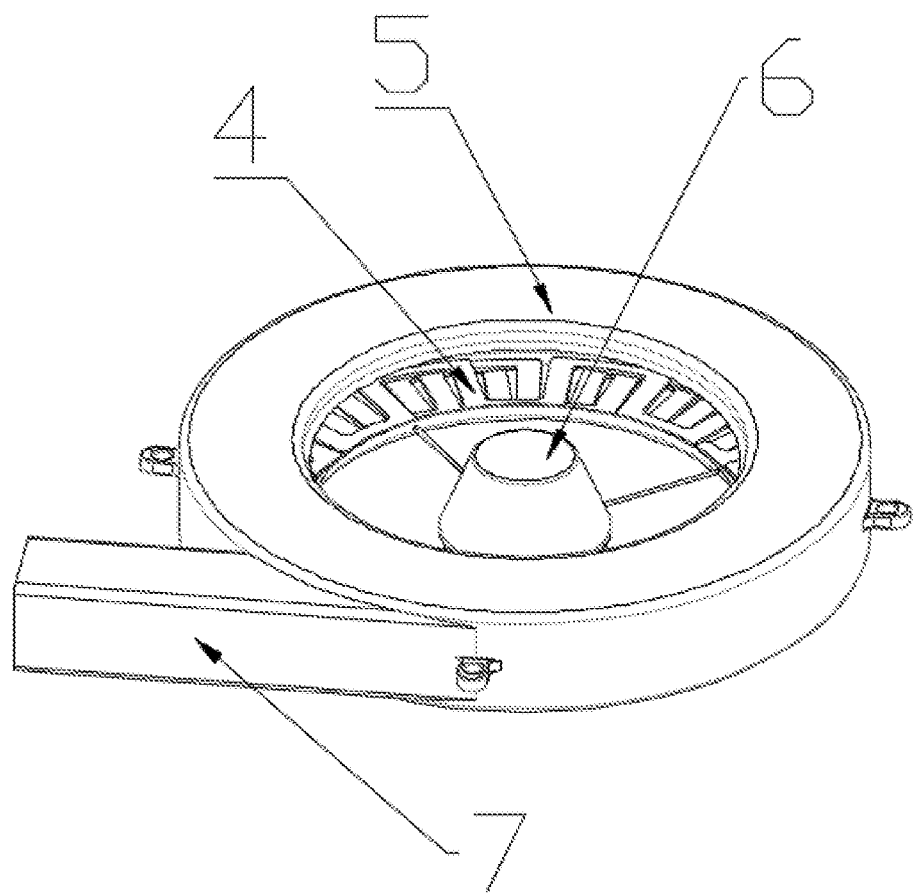
FIG. 3A is an axonometric drawing of a stator system of the disclosure.
Figure 3B:
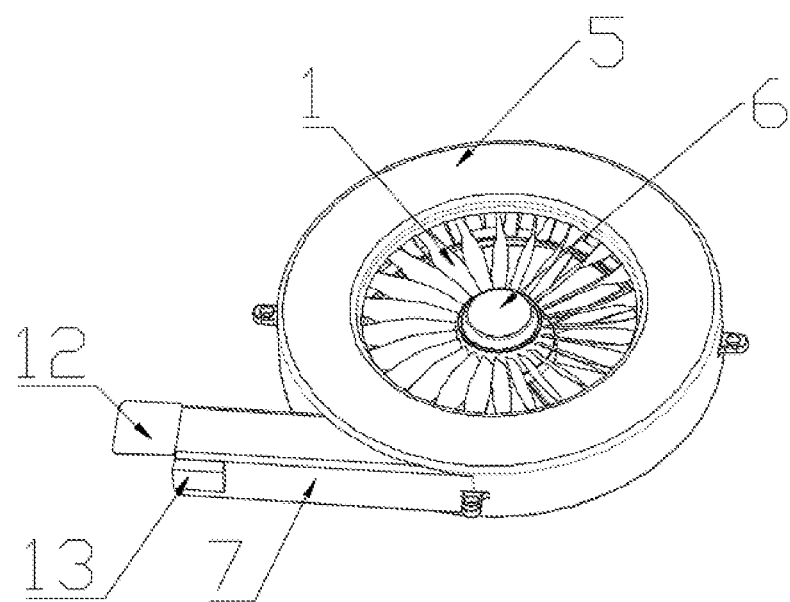
FIG. 3B is an axonometric drawing of the stator system in FIG. 3A in assembly with a rotor system according to an embodiment of the disclosure.
Figure 4:
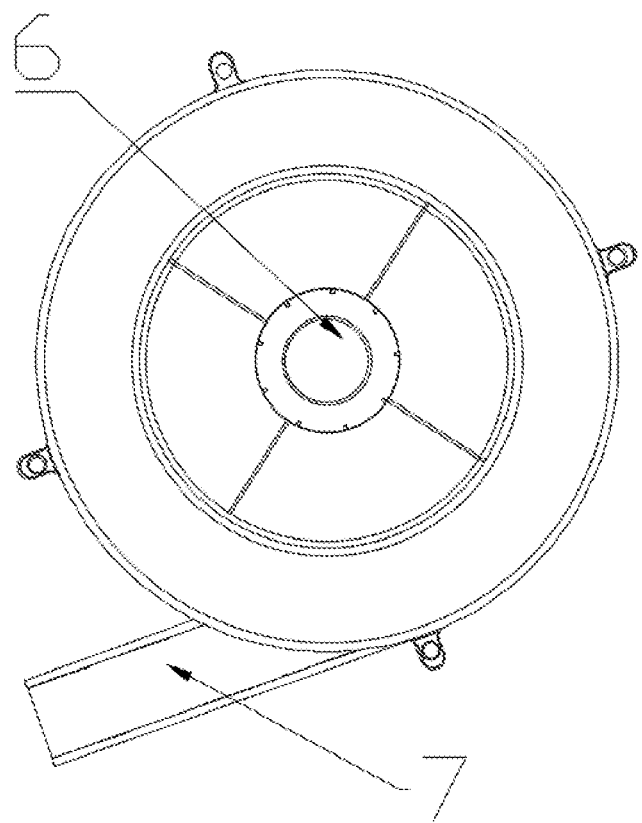
FIG. 4 is a top view diagram of a stator system according to an embodiment of the disclosure.
Figure 5A:
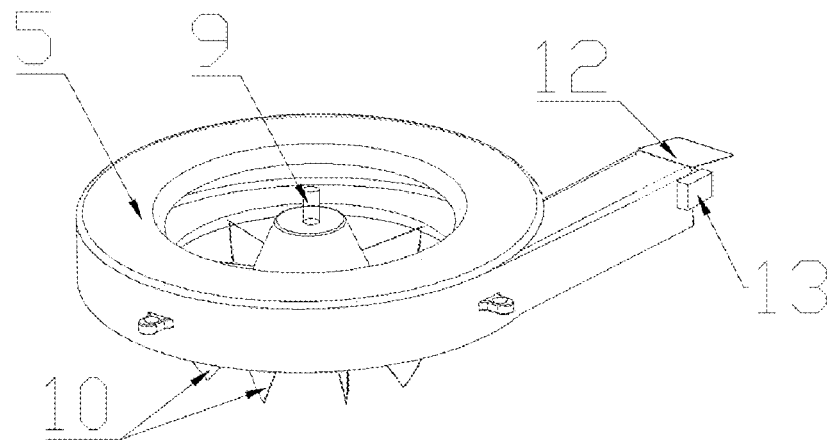
FIG. 5A is an axonometric drawing of an air exhaust control system according to an embodiment of the disclosure.
Figure 5B:
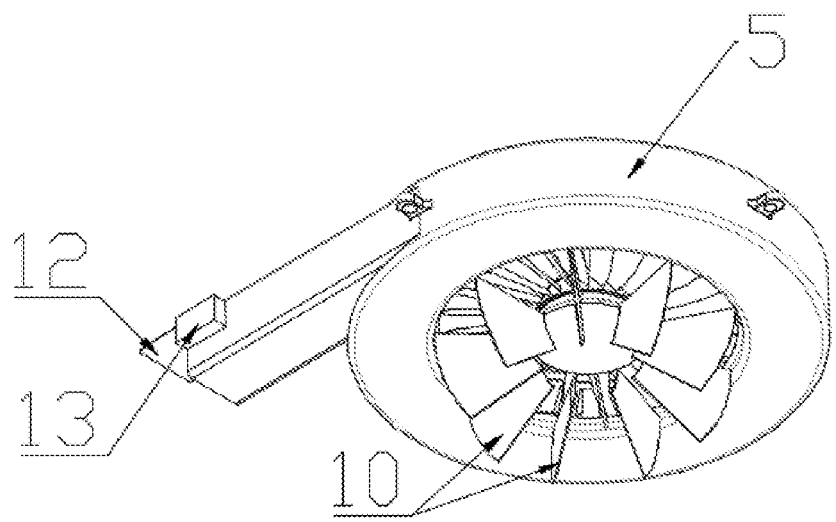
FIG. 5B is an axonometric drawing of an air exhaust control system according to another embodiment of the disclosure.
Figure 5C:
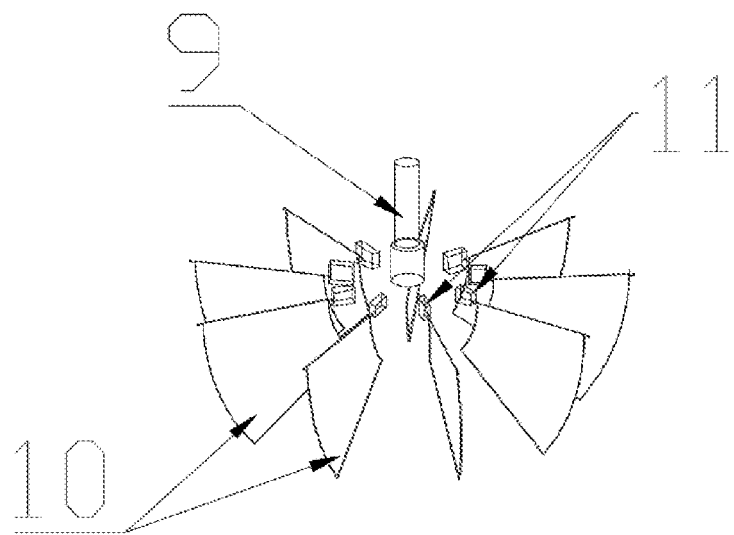
FIG. 5C is an exploded structural diagram of the exhaust control system according to an embodiment of the disclosure.
Figure 5D:
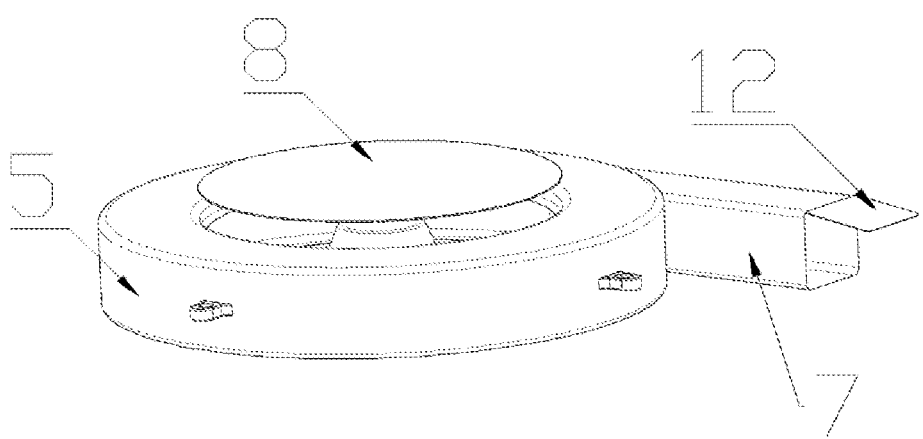
FIG. 5D is an axonometric drawing of an air intake control system according to an embodiment of the disclosure.
Figure 5E:
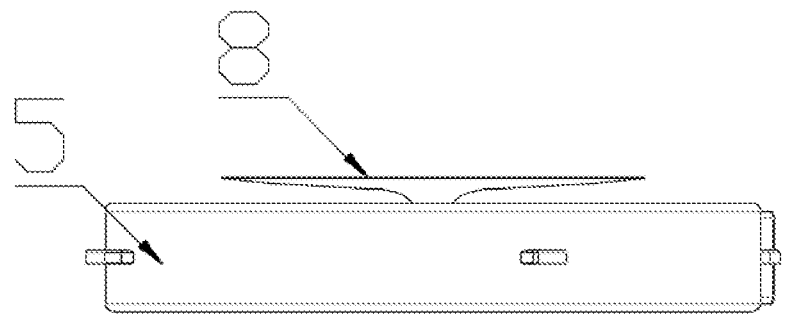
FIG. 5E is a partial side view diagram of an air intake control system according to an embodiment of the disclosure.
Figure 6:
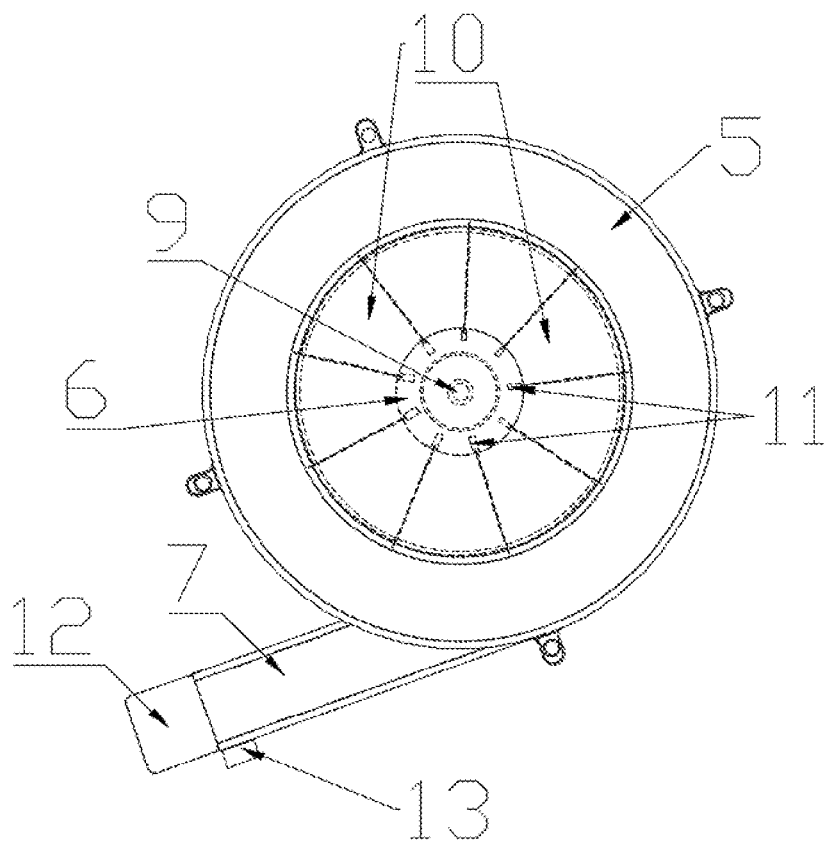
FIG. 6 is a top view diagram of an air intake/exhaust control system with axial flow control motors according to an embodiment of the disclosure.
Figure 7:
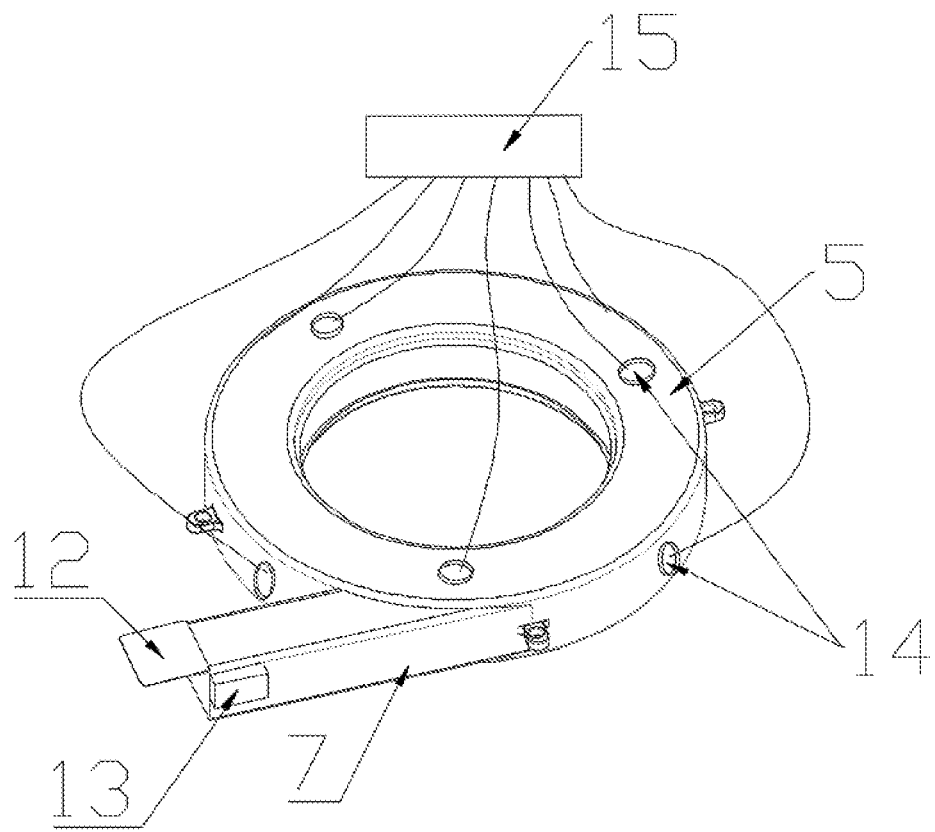
FIG. 7 is an axonometric drawing of a detection system of the disclosure.
Figure 8:
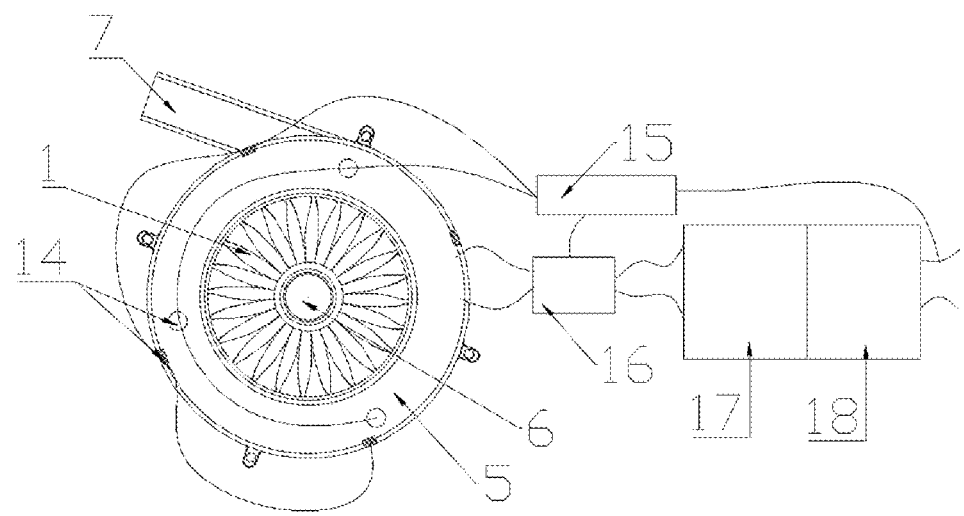
FIG. 8 is an electrical connection diagram of a detection system according to an embodiment of the disclosure.

As shown in FIGS. 1-6, a ducted fan device integrated with a permanent magnet synchronous disc flat wire motor includes a rotor system, a stator system, an air intake/exhaust control system, a detection system, a driving system and a power supply system. The stator system includes flat wire coils 4, a motor shell 5 and a stator conical shaft 6. The motor shell 5 is of an annular barrel structure and has a similar shape to a duct, i.e. the motor shell 5 is integrated with the duct. A plurality of layers of flat wire coils 4 are respectively arranged on an upper end face and a lower end face of an inner wall of the motor shell 5. The flat wire coils 4 on each of the end faces are connected in series in an end-to-end mode. The stator conical shaft 6 is fixedly connected with a bottom of the motor shell 5 through a plurality of fixed pieces. The rotor system is arranged inside the stator system, including axial flow and radial flow composite integrated blades 1, a conical connecting sleeve 2 and permanent magnets 3. The conical connecting sleeve 2 is matched with the stator conical shaft 6. The axial flow and radial flow composite integrated blades 1, including 24 blades in 12 sets, are distributed in a circumferential direction of an outer side face of the conical connecting sleeve 2. The 24 blades in 12 sets are evenly distributed along a circumferential direction. The permanent magnets 3 are arranged on outer sides of the axial flow and radial flow composite integrated blades 1, and are located between an upper set and a lower set of the plurality of layers of flat wire coils 4, i.e. a motor rotor is combined with fan blades. In a static state, the conical connecting sleeve 2 of a rotor sleeves the stator conical shaft 6, i.e. sliding friction occurs at low speed, and during high-speed rotation, the coils drive the permanent magnets 3 to rotate, meanwhile the permanent magnets 3 in high-speed rotation cut the flat wire coils 4 to generate an induction eddy current so as to achieve magnetic levitation of the rotor system. The conical connecting sleeve 2 is not in contact with the stator conical shaft 6, and at the same time a current flowing along a circumference generates a constraining centripetal force on the permanent magnets 3 to reduce a pulling force of the permanent magnets 3 on a fan material during high-speed rotation. The detection system is electrically connected with the motor shell 5 and the power supply system. The driving system is electrically connected with the flat wire coils 4 and the power supply system, and the detection system is electrically connected with the driving system. After the flat wire coils 4 are electrified through the driving system, the rotor system operates at high speed. An eddy current generated on the flat wire coils 4 realizes magnetic levitation of the rotor system. At the same time, the rotor system has a gyro stabilization effect in a process of high-speed operation due to large rotational inertia caused by external arrangement of the permanent magnets 3. The detection system is electrically connected with the motor shell 5 and the power supply system. The driving system is electrically connected with the flat wire coils 4 and the power supply system, and the detection system is electrically connected with the driving system. The driving system drives the axial flow and radial flow composite integrated blades 1 to rotate in the motor shell 5. The power supply system provides a power source for the detection system and the driving system, and the detection system detects the rotor system and processes collected data to control operation state of the driving system.

Preferably, the stator system further includes a diffusion cavity 7. The diffusion cavity 7 and the motor shell 5 are tangentially arranged, the diffusion cavity 7 and the motor shell 5 are arranged in a communicating mode to perform diffusion diversion on centrifugal compressed gas. A centrifugal exhaust cover plate 12 is arranged at an exhaust port of the diffusion cavity 7. A centrifugal control motor 13 is arranged outside the exhaust port of the diffusion cavity 7. A side of the centrifugal exhaust cover plate 12 is connected with the centrifugal control motor 13 through a connecting shaft, and the centrifugal control motor 13 controls the centrifugal exhaust cover plate 12 to rotate and thereby controls opening and closing of the diffusion cavity 7.

Preferably, from inner to outer of the axial flow and radial flow composite integrated blades 1 along a radial direction, axial flow blades are arranged on an inner ring, and vertical radial flow centrifugal blades are arranged on an outer ring. The axial flow blades are arranged from inner to an outer ⅔ position of the axial flow and radial flow composite integrated blades 1 along the radial direction, and the vertical radial flow centrifugal blades are arranged gradually from the ⅔ position to outer along the radial direction, thus the outmost ring of the radial flow centrifugal blades are exactly of a same shape as the permanent magnets 3, i.e. a part of the radial flow centrifugal blades are replaced by the permanent magnets 3, and at the same time, the axial flow blades are composited with the radial flow centrifugal blades, so the blades have both an axial gas compression ability and a centrifugal gas compression ability.

Preferably, the air intake/exhaust control system includes an air inlet cover plate 8, a linear control motor 9, axial flow exhaust guide plates 10 and axial flow control motors 11. The air inlet cover plate 8 is of a circular thin plate structure, and is arranged at an air inlet in an upper end face of the motor shell 5. The linear control motor 9 is arranged inside the stator conical shaft 6. A top end of the linear control motor 9 is in screw connection with the air inlet cover plate 8. The linear control motor 9 is configured to control lifting of the air inlet cover plate 8 so as to control opening and closing of the air inlet and a size of the air inlet. The axial flow control motors 11 are distributed at a circumference inside the stator conical shaft 6. The axial flow exhaust guide plates 10 are of a fan-shaped plate structure. One side of each of the axial flow exhaust guide plates 10 is connected with the corresponding axial flow control motor 11 through a connecting shaft, while the other side is in shaft connection with the bottom of the motor shell 5 through the connecting shaft, and the axial flow control motors 11 control the axial flow exhaust guide plates to rotate so as to control opening and closing of the exhaust port and the size and a direction of the exhaust port.

Because of integration of the permanent magnets 3 and the axial flow and radial flow composite integrated blades 1, the rotor system has a flywheel energy storage effect due to large rotational inertia. When the air inlet cover plate 8 is closed, no gas enters, and the rotor system has a small resistance. The rotor may reach a speed much higher than a normal rated speed under a same power, and excess energy is stored in a flywheel. When the air inlet cover plate 8 is opened, the resistance is increased. The rotation speed decreases and the flywheel outputs the energy. At the moment, under combined action of a power supply and flywheel energy storage, the motor power is much larger than a rated power, which makes the motor have the characteristics of short-time super high power.

Preferably, the detection system includes gap sensors 14 and a signal analysis control panel 15. A plurality of sets of gap sensors 14 are arranged. The plurality of sets of gap sensors 14 are evenly distributed along a circumferential direction inside the cylindrical face of the motor shell 5. A plurality of sets of gap sensors 14 are evenly distributed on an upper end face of the motor shell 5. The gap sensors 14 are connected with an amplifying circuit through cables and are finally connected with the signal analysis control panel 15. The signal analysis control panel 15 is electrically connected with the driving system. Specifically, four sets of gap sensors 14 are evenly distributed along the circumferential direction inside the cylindrical face of the motor shell 5, and three sets of gap sensors 14 are distributed at the upper end face of the motor shell 5. Because of integration of permanent magnets and a rotor of the rotor system and the fan blades, the rotor system has large rotational inertia which makes the rotor system not only have the flywheel energy storage effect, but also have the gyro stabilization effect at high-speed rotation, therefore the rotor and the motor have gyro directivity and a gyro sensing function. Specifically, the gyro sensing is performed as follows: a distance between a gyro and the motor shell is detected by the gap sensors 14 and then the rotor attitude is calculated. The four sets of gap sensors 14 distributed in the circumferential direction may detect a rotation speed and a horizontal plane displacement attitude of the rotor during magnetic levitation, and the three sets of gap sensors 14 distributed on the end face may detect tilting and rolling angles of the rotor system. The gap sensors 14 are connected with the amplifying circuit through the cables and are finally connected with the signal analysis control panel 15. The signal analysis control panel 15 performs attitude algorithm on detected signals. The signal analysis control panel 15 is electrically connected to the driving system to provide a basis of judgment for a driving signal.

Preferably, the driving system adopts a variable frequency alternating current machine driver 16.

Preferably, the power supply system includes a booster 17 and an inverter 18. The voltage of a direct current power supply is modulated to a rated voltage range of the motor through the booster 17, and the direct current is modulated into alternating current through the inverter 18 and is supplied to the driving system. The driving system subjects the alternating current modulated by the inverter 18 to frequency conversion according to operating state information of the variable frequency alternating current machine driver 16 provided by the detection system, and then drives the variable frequency alternating current machine driver 16. The voltage of the direct current power supply is modulated to a suitable voltage through a voltage stabilizing module to supply power for the detection system and other weak electricity consuming equipment.

Preferably, the flat wire coils 4 are of an annular tooth-shaped structure. Three sets of flat wire coils 4 are arranged in total, and the flat wire coils 4 in each set are alternately arranged.

Preferably, the diffusion cavity 7 is of a square shell structure.

A starting process: firstly, electrification is realized, and the air inlet cover plate 8 is closed. The axial flow and radial flow composite integrated blades 1 are driven to rotate. The conical connecting sleeve 2 is in sliding friction with the stator conical shaft 6 at low-speed rotation, and then the permanent magnets 3 cut the flat wire coils 4 to generate an induction eddy current when the rotation speed is increased, therefore magnetic levitation of the rotor system is achieved, and the conical connecting sleeve 2 is not in contact with the stator conical shaft 6. Meanwhile, no gas enters the motor, thus the rotor has a small resistance, and the rotor may reach the speed much higher than the normal rated speed under the same power. Excess energy is stored in the flywheel using the flywheel energy storage. Then the air inlet cover plate 8 is opened, thus the resistance is increased. The speed decreases, and the flywheel outputs the energy. At the moment, under the combined action of the power supply and flywheel energy storage, the motor power is much larger than the rated power, so the gas absorbed by the axial flow and radial flow composite integrated blades 1 is respectively subjected to axial pressurization and centrifugal pressurization and is then exhausted downwardly and backwardly.

A rated process: after the motor is started, the rotation speed of the rotor system is decreased to a rated state. The detection system detects the attitude of the rotor system to provide a judgment basis for the driving system. At the same time, because of the gyro stabilization effect under a high rotation speed, the rotor and the motor have gyro directivity, so stability, namely a self-stabilizing ability against external attitude interference, of the axial flow and radial flow composite integrated blades 1 is increased.

Power failure: in the event of a power supply failure of the flat wire coils 4, because the rotor system has the flywheel energy storage effect due to the large rotational inertia and a high-speed rotation state of the axial flow and radial flow composite integrated blades 1, the flat wire coils 4 do not stop rotation immediately after being powered off but will gradually decelerate to a static state.

Gyro stabilization: the rotor system has the gyro stabilization effect due to the large rotational inertia and the high-speed rotation state of the axial flow and radial flow composite integrated blades 1, and in a take-off state, the gyro stabilization effect may greatly reduce balance attitude control of an aircraft; and at the same time. In a cruise state, when the aircraft is disturbed by unstable airflow, the gyro stabilization effect greatly enhances robustness of the aircraft against disturbances, reduces flight control difficulty and enhances safety of the aircraft.

Only the preferred embodiments of the disclosure have been described in detail above, but the disclosure is not limited to the above-mentioned embodiments. Within the scope of knowledge possessed by those of ordinary skill in the art, various modifications can be made without departing from the purpose of the disclosure. Such modifications should be included in the protection scope of the disclosure.

What is claimed is:

1. A ducted fan device integrated with a permanent magnet synchronous disc flat wire motor, comprising:
    a rotor system,
    a stator system,
    an air intake/exhaust control system,
    a detection system,
    a driving system, and
    a power supply system;
    wherein the stator system comprises flat wire coils (4), a motor shell (5) having an annular barrel structure, and a stator conical shaft (6), wherein a plurality of layers of flat wire coils (4) are respectively arranged on an upper end face and a lower end face of an inner wall of the motor shell (5), the flat wire coils (4) on each of the end faces being connected in series in an end-to-end mode, wherein the stator conical shaft (6) is fixedly connected with a bottom of the motor shell (5) through a plurality of fixed pieces;
    wherein the rotor system is arranged inside the stator system and comprises axial flow and radial flow composite integrated blades (1), a conical connecting sleeve (2), and permanent magnets (3), the conical connecting sleeve (2) being matched with the stator conical shaft (6), wherein the axial flow and radial flow composite integrated blades (1) are distributed in a circumferential direction of an outer side face of the conical connecting sleeve (2), and wherein the permanent magnets (3) are arranged on outer sides of the axial flow and radial flow composite integrated blades (1) and are located between an upper set and a lower set of the plurality of layers of flat wire coils (4); and
    wherein the detection system is electrically connected with the motor shell (5) and the power supply system, the driving system is electrically connected with the flat wire coils (4) and the power supply system, and the detection system is electrically connected with the driving system.

2. The ducted fan device integrated with the permanent magnet synchronous disc flat wire motor according to claim 1, wherein:
    the stator system further comprises a diffusion cavity (7), wherein the diffusion cavity (7) and the motor shell (5) are tangentially arranged, and are arranged in a communicating mode to perform diffusion diversion on centrifugal compressed gas;
    a centrifugal exhaust cover plate (12) is arranged at an exhaust port of the diffusion cavity (7), and a centrifugal control motor (13) is arranged outside the exhaust port of the diffusion cavity (7); and
    a side of the centrifugal exhaust cover plate (12) is connected with the centrifugal control motor (13) through a connecting shaft.

3. The ducted fan device integrated with the permanent magnet synchronous disc flat wire motor according to claim 1, wherein from inner to outer of the axial flow and radial flow composite integrated blades (1) along a radial direction, axial flow blades are arranged on an inner ring, and vertical radial flow centrifugal blades are arranged on an outer ring.

4. The ducted fan device integrated with the permanent magnet synchronous disc flat wire motor according to claim 1, wherein the air intake/exhaust control system comprises an air inlet cover plate (8), a linear control motor (9), axial flow exhaust guide plates (10) and axial flow control motors (11); the air inlet cover plate (8) is of a circular thin plate structure, and is arranged at an air inlet in an upper end face of the motor shell (5); the linear control motor (9) is arranged inside the stator conical shaft (6); a top end of the linear control motor (9) is in screw connection with the air inlet cover plate (8), and the linear control motor (9) is configured to control lifting of the air inlet cover plate (8) so as to control opening and closing of the air inlet and a size of the air inlet; the axial flow control motors (11) are distributed at a circumference inside the stator conical shaft (6); and the axial flow exhaust guide plates (10) are of a fan-shaped plate structure, and one side of each of the axial flow exhaust guide plates (10) is connected with one corresponding axial flow control motor (11) through a connecting shaft, while the other side is in shaft connection with the bottom of the motor shell (5) through the connecting shaft.

5. The ducted fan device integrated with the permanent magnet synchronous disc flat wire motor according to claim 1, wherein the detection system comprises a plurality of sets of gap sensors (14) and a signal analysis control panel (15), wherein the plurality of sets of gap sensors (14) are evenly distributed along a circumferential direction inside a cylindrical face of the motor shell (5), and the plurality of sets of gap sensors (14) are evenly distributed on an upper end face of the motor shell (5), wherein each of the gap sensors (14) is connected with an amplifying circuit through cables and is finally connected with the signal analysis control panel (15), and wherein the signal analysis control panel (15) is electrically connected with the driving system.

6. The ducted fan device integrated with the permanent magnet synchronous disc flat wire motor according to claim 1, wherein the driving system adopts a variable frequency alternating current machine driver (16).

7. The ducted fan device integrated with the permanent magnet synchronous disc flat wire motor according to claim 1, wherein the power supply system comprises a booster (17) and an inverter (18).

8. The ducted fan device integrated with the permanent magnet synchronous disc flat wire motor according to claim 1, wherein the flat wire coils (4) are of an annular tooth-shaped structure, three sets of flat wire coils (4) are arranged in total, and the flat wire coils in each set (4) are alternately arranged.

9. The ducted fan device integrated with the permanent magnet synchronous disc flat wire motor according to claim 2, wherein the diffusion cavity (7) is of a square shell structure, and the centrifugal exhaust cover plate (12) is of a square plate-shaped structure matched with a section of the diffusion cavity (7).

\* \* \* \* \*